(12) United States Patent
Todeschini (10) Patent No.: US 10,715,974 B2
(45) Date of Patent: Jul. 14, 2020

(54) METHODS FOR PROVISIONING A WIRELESS BEACON

(71) Applicant: Hand Held Products, Inc., Fort Mill, SC (US)

(72) Inventor: Erik Todeschini, Camillus, NY (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 0 days.

(21) Appl. No.: 16/662,988

(22) Filed: Oct. 24, 2019

(65) Prior Publication Data

US 2020/0059764 A1 Feb. 20, 2020

Related U.S. Application Data

(63) Continuation of application No. 15/263,644, filed on Sep. 13, 2016, now Pat. No. 10,484,847.

(51) Int. Cl.
| | |
|---|---|
| *H04W 4/33* | (2018.01) |
| *H04W 40/24* | (2009.01) |
| *H04B 17/318* | (2015.01) |
| *H04L 29/12* | (2006.01) |
| *G06K 7/14* | (2006.01) |
| *G06K 7/10* | (2006.01) |
| *H04W 4/80* | (2018.01) |
| *H04L 29/08* | (2006.01) |
| *H04W 4/02* | (2018.01) |

(Continued)

(52) U.S. Cl.
CPC .......... *H04W 4/33* (2018.02); *G06K 7/10722* (2013.01); *G06K 7/1413* (2013.01); *H04B 17/318* (2015.01); *H04L 61/6022* (2013.01); *H04L 67/12* (2013.01); *H04L 67/18* (2013.01); *H04W 4/02* (2013.01); *H04W 4/025* (2013.01); *H04W 4/80* (2018.02); *H04W 40/244* (2013.01); *H04W 4/021* (2013.01); *H04W 4/029* (2018.02); *H04W 4/38* (2018.02)

(58) Field of Classification Search
CPC ........... H04W 4/33; H04W 4/80; H04W 4/02; H04W 4/025; H04W 40/244; H04B 17/318; G06K 7/10722; G06K 7/1413; H04L 61/6022; H04L 67/12; H04L 67/18
See application file for complete search history.

(56) References Cited

U.S. PATENT DOCUMENTS

| | | | |
|---|---|---|---|
| 9,462,423 B1* | 10/2016 | Rivlin | .................. H04W 4/043 |
| 2014/0118113 A1* | 5/2014 | Kaushik | ................ H04W 12/12 340/8.1 |
| 2018/0102858 A1* | 4/2018 | Tiwari | ................... H04L 67/12 |

OTHER PUBLICATIONS

U.S. Appl. No. 15/263,644, filed Sep. 13, 2016, U.S. Pat. No. 10,484,847.

(Continued)

*Primary Examiner* — Ernest G Tacsik
(74) *Attorney, Agent, or Firm* — Alston & Bird LLP (57) ABSTRACT

A method to associate a unique identifier (ID) of an object, such as a Bluetooth Low Energy beacon, to a spatial coordinate in a facility is described. In one embodiment, the method utilizes a visual indicator, such a barcode to transfer a beacon's unique ID to a mobile device. In another embodiment, the method transfers a beacon's unique ID to the mobile device via an optical data transmission. For either embodiment, the transfer is activated by a user prompting an activation sensor, such as a push button, on the beacon, or by the user sending a wireless signal from the mobile device to the beacon.

11 Claims, 5 Drawing Sheets

(51) Int. Cl.
*H04W 4/021* (2018.01)
*H04W 4/38* (2018.01)
*H04W 4/029* (2018.01)

(56) References Cited

OTHER PUBLICATIONS

Annex to the communication dated Apr. 30, 2020 for EP Application No. 17190434.
Communication from the Examining Division dated Apr. 30, 2020 for EP Application No. 17190434.

* cited by examiner

METHODS FOR PROVISIONING A WIRELESS BEACON

CROSS-REFERENCE TO RELATED APPLICATION(S)

This application is a continuation of and claims the benefit of priority to U.S. application Ser. No. 15/263,644 entitled "METHODS FOR PROVISIONING A WIRELESS BEACON" filed on Sep. 13, 2016, the entirety of which is incorporated by reference herein.

FIELD OF THE INVENTION

The present invention relates to methods and apparatuses for provisioning a set of Radio Frequency (RF) beacons to facilitate indoor positioning in an area such as a warehouse facility. More particularly, the present invention relates to utilizing a barcode or optical data transmission to communicate an identification of an RF beacon to a mobile device that maps location of the BLE beacon and its associated identification.

BACKGROUND

Generally speaking wireless technology may be a useful tool to communicate and determine the positioning of objects in an area, such as a warehouse facility. The objective may be to generate a facility floor plan that maps objects in the facility and an identifier associated with the object. In one example, wireless devices are located at various points in the facility. A mobile device roams around the facility and communicates with the wireless devices that are each located near an object. Part of the communications may include measuring the signal strength to determine the location of the wireless devices relative to the mobile device. Due to multipath signal propagation and other factors this method may be prone to errors. Although the mobile device may be closer to device A than device B, the received signal strength of device B may be stronger than the received signal strength of device A. Therefore, the mobile device may accept the identification of what it considers to be the closest beacon (i.e. Bluetooth MAC address), as the identifier of the beacon it is collocated with. This creates an incorrect mapping of beacon identifier to spatial coordinate within the facility floor plan and introduces error into any system utilizing this data. Moreover, this method is quite time consuming to collect and record the data.

Therefore, a need exists for improve the accuracy, as well as reduce the time to efficiently communicate an identifier for the wireless device and map the identifier on a mobile device.

SUMMARY

Accordingly, in one aspect, the present invention embraces methods and apparatuses to associate a wireless technology such as a Bluetooth Low energy (BLE) beacon to a spatial coordinate within a facility.

In an exemplary embodiment, a method comprises egressing, with a mobile device, in proximity to one or more beacon devices; selecting, with the mobile device, a procedure to communicate with one or more beacon devices;

If the selected procedure is a physical activation: selecting, with the mobile device, a set of beacon devices, and prompting, with the mobile device, an activation sensor on the set of beacon devices to cause the set of beacon devices to display their respective barcodes. If the selected procedure is a wireless communication: sending, with the mobile device, a wireless signal in order to select another set of beacon devices, and prompting, with the mobile device, the another set of beacon devices to display their respective barcodes.

The method further comprises: scanning, with the mobile device, the respective barcodes of the set of beacon devices or the another set of beacon devices, depending of the selected procedure, to obtain their respective identifications, wherein selected beacons comprise at least one beacon from the set of beacon devices or at least one beacon from the another set of beacon devices; mapping, with the mobile device, the respective identifications and associated location information of the selected beacon devices on a floor plan; and storing, with the mobile device, the respective identifications of the selected beacon devices in a database.

The method further comprises: if the selected procedure is a wireless communication: measuring, with the mobile device, a signal strength of the wireless communication of the one or more beacon devices, and selecting, with the mobile device, another set of beacon devices that have a signal strength greater than a predefined threshold value. The one or more beacon devices and the mobile device communicate on an ad-hoc basis utilizing Bluetooth Generic Attribute (BT GATT) service. The respective identifications comprise an encoded MAC address for each beacon device.

In another exemplary embodiment, the method comprises: selecting, with a mobile device, a procedure to communicate with one or more stationary devices; prompting, with the mobile device, the one or more stationary devices to provide their identifications to the mobile device utilizing the selected procedure; receiving, with the mobile device, the identifications for the one or more stationary devices; and mapping, with the mobile device, the identifications and associated location information of the one or more stationary devices on a floor plan.

The method further comprises: egressing, with the mobile device, in proximity to a selected stationary device; and communicating, with the mobile device, with the selected stationary device by prompting an activation sensor on the selected stationary device causing the selected stationary device to display a barcode that depicts identification for the selected stationary device; and scanning, with the mobile device, the barcode to receive the identification of the selected stationary device. The method comprises: communicating, with the mobile device, by sending a wireless signal from the mobile device to the one or more stationary devices; measuring, with the mobile device, a signal strength of the communication with the one or more stationary devices; selecting, with the mobile device, the one or more stationary devices that have a signal strength greater than a predefined threshold value; and prompting each of the selected one or more stationary devices to display a visual indicator comprising an identification, wherein, if the visual indicator comprises a barcode, scanning the barcode with the mobile device to acquire the identification The method further comprises instructing, with the mobile device, each of the selected one or more stationary devices to display the visual indicator at a particular time and/or for a predetermined period of time.

The method further comprises communicating with the one or more stationary devices by: prompting an activation sensor on each of the stationary devices; and receiving light pulses comprising the identifications of each of the stationary devices from optical transmitters on each of the one or more stationary devices.

The method further comprises: communicating, with the mobile device, by sending a wireless signal from the mobile device to the one or more stationary devices; measuring, with the mobile device, a signal strength of the communication with the one or more stationary devices; selecting, with the mobile device, the one or more stationary devices that have a signal strength greater than a predefined threshold value; prompting, with the mobile device, each of the selected one or more stationary devices to transmit fight pulses comprising its identification to the mobile device The method further comprises: in response to determining that the mobile device is in proximity to one of the one or more stationary devices, saving associated location information on the mobile device. The identifications comprise an encoded MAC address.

In yet another exemplary embodiment, the method comprises: egressing, with a mobile device, in proximity to one or more stationary devices; selecting, with the mobile device, a procedure to communicate with one or more stationary devices.

If the selected procedure is a physical activation: selecting, with the mobile device, a set of stationary devices, prompting, with the mobile device, an activation sensor on the set of stationary devices to cause the set of stationary devices to display their respective barcodes; and scanning, with the mobile device, the respective barcodes of the set of stationary devices to obtain their respective identification information.

If the selected procedure is a wireless communication: sending, with the mobile device, a wireless signal in order to select another set of stationary devices, and prompting, with the mobile device, the another set of stationary devices to transmit light pulses to the mobile device comprising their respective identification information;

The method further comprises receiving, with the mobile device, the respective identification information for selected stationary devices, wherein the selected stationary devices comprise at least one stationary device from the set of stationary devices or at least one stationary device from the another set of stationary devices, depending on the selected procedure; and mapping, with the mobile device, the respective identification information and associated location information of the selected stationary devices on a floor plan. The identification information comprises an encoded MAC address for each stationary device.

The method further comprises storing the respective identification information of the selected stationary devices in a database. Also, the one or more stationary devices utilize Bluetooth Low Energy (BLE) technology.

If the selected procedure is a wireless communication: measuring, with the mobile device, a signal strength of the wireless communication of the one or more stationary devices. And selecting, with the mobile device, the another set of one or more stationary devices that have a signal strength greater than a predefined threshold value. Additionally, the method comprise, in response to determining that the mobile device is in proximity to one of the one or more beacon devices, saving associated location information on the mobile device.

egressing, with a mobile device, in proximity to one or more stationary devices; selecting, with the mobile device, a procedure to communicate with one or more stationary devices; prompting, with the mobile device, the one or more stationary devices to display their respective barcodes to the mobile device utilizing the selected procedure.

If the selected procedure is a physical activation, prompting an activation sensor to select a set of stationary devices and causing the set of beacon devices to display their respective barcodes.

If the selected procedure is a wireless communication: sending, with the mobile device, a wireless signal in order to select another set of stationary devices, and prompting, with the mobile device, the other set of stationary devices to transmit light pulses to the mobile device comprising identification information; receiving, with the mobile device, the identification information for the one or more stationary devices; and mapping, with the mobile device, the respective identifications and associated location information of the selected stationary devices on a floor plan.

The method further comprises: scanning, with the mobile device, the identification information of the selected stationary devices, wherein the identification information is a barcode, and storing the identification information of the selected stationary devices in a database. The one or more beacon devices utilize Bluetooth Low Energy (BLE) technology Moreover, if the selected procedure is a wireless communication: measuring, with the mobile device, a signal strength of the wireless communication of the one or more stationary devices, and selecting, with the mobile device, the one or more stationary devices that have a signal strength greater than a predefined threshold value. Additionally, in response to determining that the mobile device is in proximity to one of the one or more stationary devices, saving associated location information on the mobile device.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces apparatus and methods of associating a unique identifier of an object to a spatial coordinate in a facility. When the object is a wireless device such as a Bluetooth Low Energy (BLE) beacon, the capabilities of the wireless device may be utilized to communicate the unique identifier with the mobile device. The mobile device may include a mapping application that may generate a facility floor plan of the wireless devices (i.e. beacons) and their associated unique identifiers. Beacons "unique identifiers" are also referred herein as beacon "identifiers" or "identification."

One of the use cases for this method is a for pick-to-light order fulfillment and that may require a low power display (e-ink) to be populated on the beacon. These beacons are hung at each pick location and will light up when their associated product may require picking. This display is used to display the pick quantity for the particular product to be picked, as well as other uses like displaying randomly generated check digits. This BLE beacon is also being used for indoor positioning. Before these beacons can be used for pick-to light order fulfillment and/or positioning they may be first be provisioning within the system. This means that their unique identifier (e.g. BT MAC address) may be associated to a spatial coordinate within the facility. This is typically done using a mobile device application that has a loaded image of the facility floor plan. After the beacons are hung around the facility, a user will need to physically walk around to each beacon, listen for that beacon's advertising packet (which would be the one with the highest received signal strength since it is closest), record its MAC address, and plot the location of the beacon on the floor plan image. This process may require a mobile device to listen for the advertising packet of each tag. Accordingly, this process may be extremely time consuming and may be prone to error caused by multipath signal propagation of other beacons (i.e. other beacons are read instead of the desired beacon, as their signal appears stronger even though they are further away).

Figure 1:
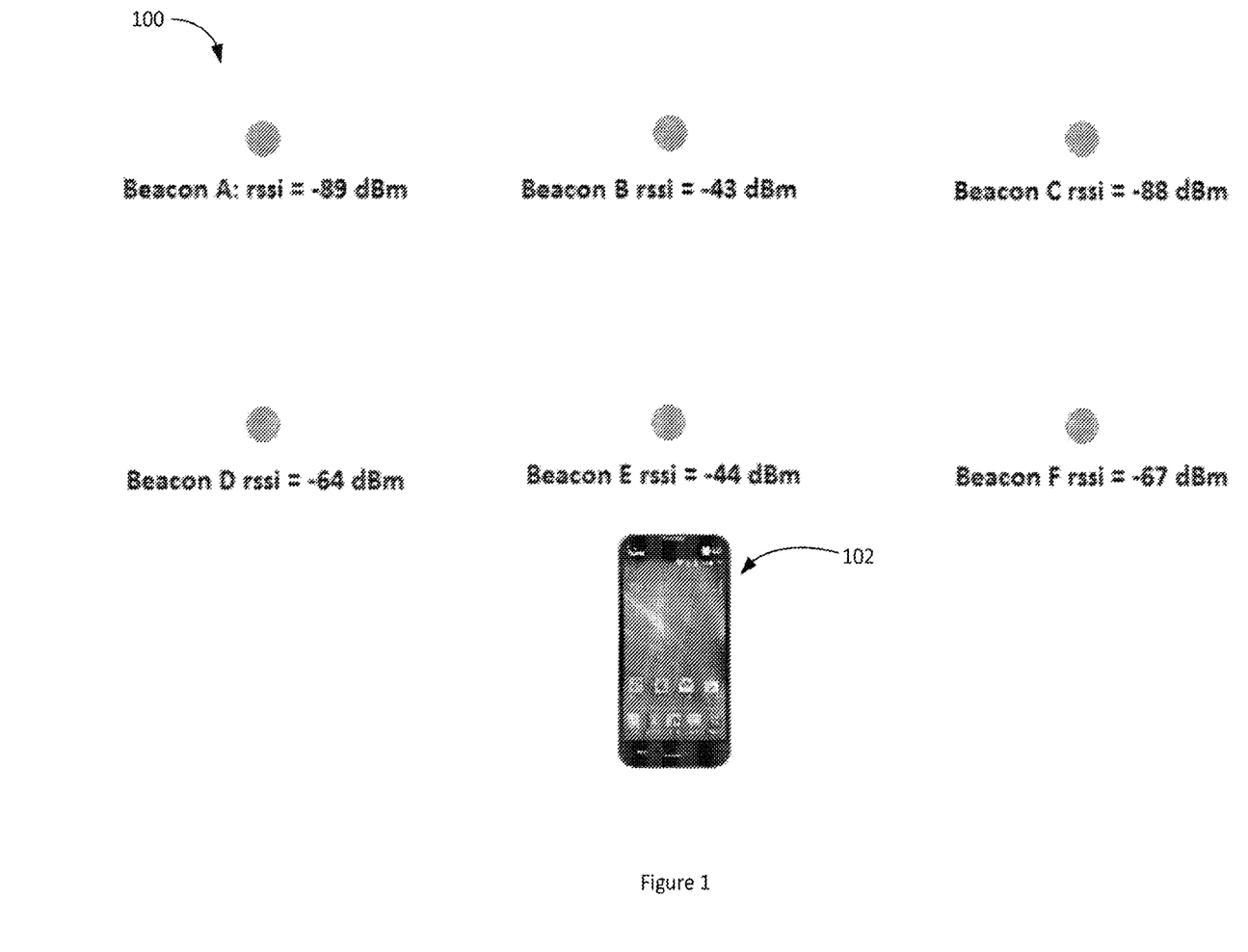
FIG. 1 schematically depicts one embodiment with a network of a mobile device in proximity to several beacons.

The method previously described for provisioning a set of beacons is illustrated in network 100 in FIG. 1. The method utilizes the received signal strength indicator (RSSI) in determining which beacon the user has proximity, i.e. the beacon the user is currently standing in front of. The method involves using a smartphone application on mobile device 102 that shows a floor plan image of a facility and may require the user to walk to each beacon, scan for the beacons in the area, and take the one with the highest signal strength and plot it's positioning on the floor plan image. Per FIG. 1, the scanned signal strength for the beacons is as follows: Beacon A: RSSI=−89 dBm; Beacon B: RSSI=−43 dBm; Beacon C: RSSI=−88 dBm; Beacon D: RSSI=−64 dBm; Beacon E: RSSI=−44 dBm; Beacon F: RSSI=−67 dBm. The mobile device would then assume the beacon with the highest signal strength would be the beacon that was closest. In the case below, the user is standing in front of beacon E but beacon B has the highest signal strength. This would lead to the user associating the unique identifier (ID) (MAC address) of beacon B with their current location in front of beacon E, which is incorrect and would introduce error into the system.

Figure 2:
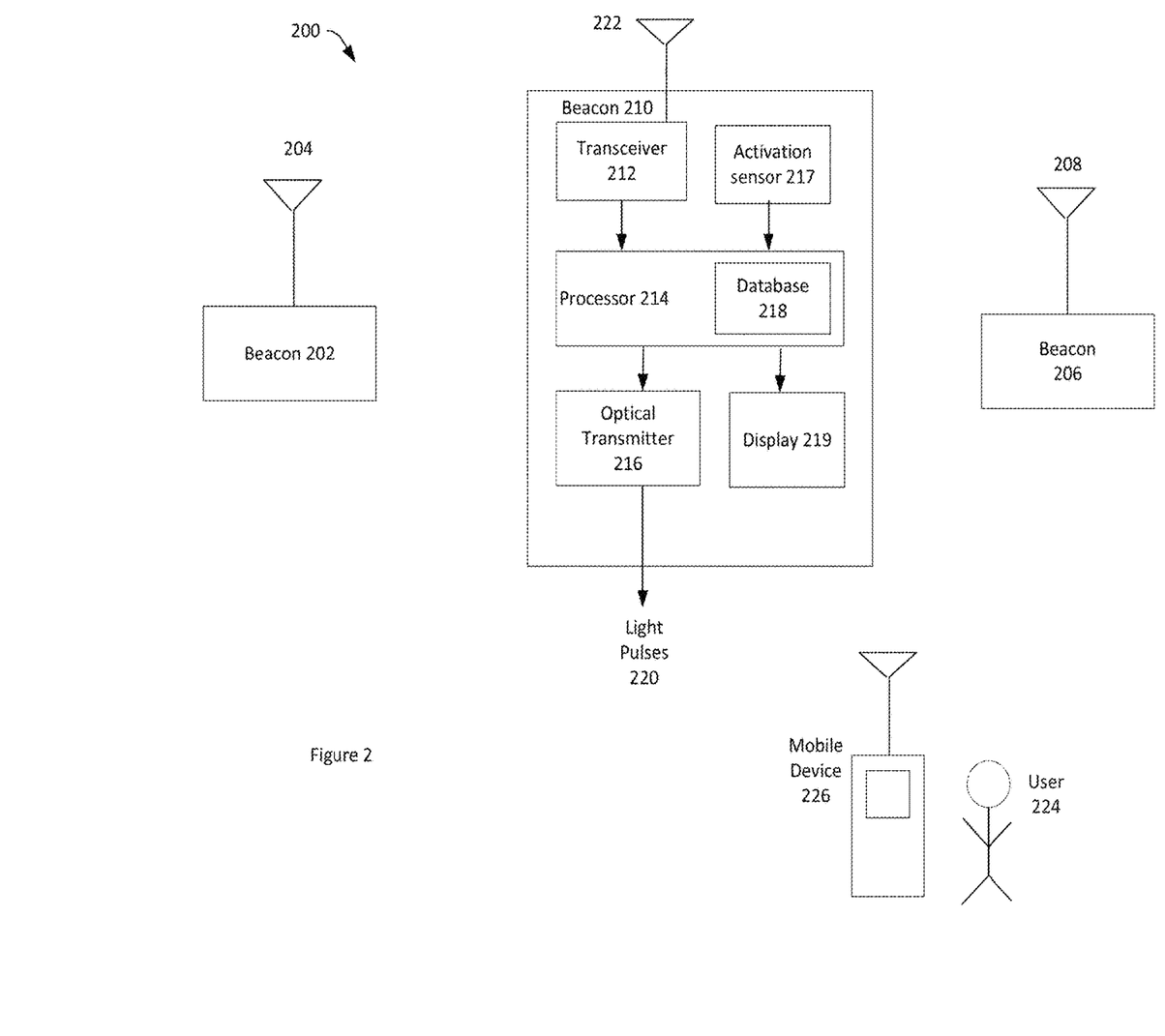
FIG. 2 schematically depicts the functional elements of a beacon.

In an exemplary embodiment, FIG. 2 illustrates network 200 that includes beacon 202, beacon 206, beacon 210, mobile device 226, and user 224. The beacon 202, beacon 206, and beacon 210 are coupled to antenna 204, antenna 208, and antenna 222, respectively. The aforementioned beacons may each communicate with the mobile device 226. When the beacons and the mobile device utilized BLE technology and communications may be implemented on ad-hoc basis. In one embodiment a dedicated Bluetooth Generic Attribute (BT GATT) service may be utilized.

FIG. 2 includes an exemplary embodiment of the functional elements of beacon 210. Beacon 210 may comprise transceiver 212, activation sensor 217, processor 214 that comprises database 218, optical transmitter 216 and display 219. Database 218 stores beacon identifications and associated location information.

Beacon 210 receives or transmits a communication signal from mobile device 226 that is operated by user 224 via antenna 222 Transceiver 212 may comprise a receiver and a transmitter. Beacon 210 may also receive inputs from user 224 when the user prompts activation sensor 217.

The output of transceiver 212 and activation sensor 217 are coupled to processor 214. Database 218 stores an identification of beacon 210 such as a MAC address. Database 218 may be flash (nonvolatile) memory. Database 218 may be considered a data store. Depending on the method and information provided by transceiver 212 or activation sensor 217, mobile device 226 may receive the identification.

Mobile device 226 may acquire location information of the beacon 210 by user 224 activating a function (e.g. tapping a key on the mobile device) to save its current location when the mobile device 226 is in proximity of beacon 210. For example, mobile device 226 is in proximity of beacon 210 when user 224, with mobile device 226, is standing in front of beacon 210.

Mobile device 226 may receive the identification by a visual indicator method or by an optical data transmission method. In the first method, beacon 210 may display a barcode on display 219 that may be scanned by user 224 using mobile device 226. The barcode may be a one dimensional (1D) or two dimensional (2D) barcode. In the second method, beacon 210 transmits optical data or light pulses 220 to mobile device 226. In either case, mobile device 226 may select either a procedure to communicate with beacon 210 by wirelessly communication (i.e. via transceiver 212) or by prompting activation sensor 217.

When mobile device 226 selects the procedure to prompt activation sensor 217, processor 214 may receive an instruction to send beacon 210's identification to display 219 in order to display the identification as a visual indicator, e.g. a barcode. User 224 may then scan the visual indicator using mobile device 226 and download the identification (e.g. MAC address) to mobile device 226. Activation sensor 217 may be implemented via a button that is pressed by user 224. One skilled in the art may recognize that other implementations are possible.

When mobile device 226 selects a procedure to wirelessly communicate with one or more beacons, the mobile device may search for beacons in an area. Mobile device 226 may connect to beacons with high signal strengths, and send instructions to display their MAC addresses via a visual indicator, e.g. a barcode, as previously described. High signal strengths may mean signal strengths meeting a predefined threshold value, or RSSI level. Mobile device 226 may maintain a list of the beacons with the highest signal strengths, then individually connect with these beacons and issue a command that instructs these beacons to display their barcode on display 219. Mobile device 226 may then proceed to scan the barcodes of the selected beacons. In one embodiment, the list of beacons comprises the top n percentile (e.g. $95^{th}$ percentile) of signal strengths.

If a BT GATT service or similar wireless service is utilized, mobile device 226 may determine when visual indicators are displayed. Also, for the embodiment illustrated in FIG. 2, issues related to multi-path propagation may be avoided inasmuch as if several beacons (i.e. tags) were instructed to display their visual indicators, user 224 may scan the visual indicators sequentially based on the signal strengths of the selected beacons.

A communication signal may be sent to transceiver 212 of beacon 210. The communication signal may instruct processor 214 to send beacon 210's identification to display 219 in order to display the identification as a barcode. User 224 may then scan the barcode using mobile device 226

After receiving the identification of beacon 210 and determining location information of beacon 210, user 224 may obtain a map of the beacon 210, with its identification, on a floor plan, such as the floor plan of a warehouse facility. That is, a software application on mobile device 226 may associate the MAC address of beacon 210 with beacon 210's current location when the user taps on the floor plan image of the facility. Beacon 202 and beacon 206 may be mapped on the floor plan in a similar manner as described above.

Also, for the embodiment illustrated in FIG. 2, issues related to multi-path propagation may be avoided inasmuch as if several beacons (i.e. tags) were instructed to display their barcodes, user 224 may scan the barcodes sequentially based on the signal strengths of the selected beacons.

As previously noted, in a second method, beacon 210 transmits optical data or light pulses 220 to mobile device 226. The second method may be beneficial since it removes the need to listen for an advertising packet of each tag, assuming that the activation sensor was utilized to start this sequence. The second method may utilize a LED on the beacon to flash a binary sequence representing the beacon's identification, e.g. BT MAC address. When the beacon is prompted, it may repetitively flash a binary sequence representing the beacon's identification. A camera, proximity sensor or other optical receiver on a mobile device will be used to view this sequence and decode the pulses of light into identification. By using method two, one can remove the need to wait 5-10 seconds to listen for beacons in the area and we can be sure that the desired beacon has been provisioned.

In the second method, mobile device 226 may select a procedure to either prompt activation sensor 217 or send a wireless communication signal. These procedures are similar to the procedures previously described for the barcode method, i.e. first method). Instead of displaying a barcode that may incorporate the identification, in method 2, the selected beacon may transmit light pulses. The light pulses may have the identification embedded therein. Mobile device 226 receives light pulses 220 and subsequently decodes the identification of beacon 210.

If a BT GATT service or similar wireless service is utilized, mobile device 226 may determine when a light pulse sequence is started and stopped. This would allow mobile device 226 to scan for beacons in the area. Mobile device 226 may connect to and instruct beacons with high signal strengths (i.e. above a predefined threshold value) to start the light pulse sequence. Accordingly, user 224 may not have to worry about multipath propagation, as it may be acceptable if several tags were instructed to light flash their identification since user 224 may be looking directly at the tag of interest.

The conversion of the BT MAC address to light pulses and back may be done as follows:

To transmit a MAC address, or any data as a series of light pulses one may need to first convert the data into its binary form as noted below:

MAC Address: 14:5D:3B:A2:06:37
Binary MAC: 00010100 01011101 00111011 10100010 00000110 00110111

Once one has completed this task, one may designate a duration of time that the LED is turned on or off to represent a single bit. This duration may need to be longer than the frame rate of the optical system receiving it. For instance, if one wants to support a traditional CCD camera system capable of processing camera frames at a rate of 30 frames per second, then the light pulse duration may need to be longer than 1000 ms/30 fps=33.33 milliseconds. This means the higher the frame rate of the receiver, the higher the transmission speed. In this example, it may allow a little leeway if 40 ms per bit is selected, which is 25 baud (1000/40):

Light Pulse Off (40 ms) represents a 0
Light Pulse On (40 ms) represents a 1

This means that the beacon may turn on the led for 40 ms to represent a '1' and turn off the led for 40 ms to represent a '0'. Taking our converted MAC address above one may see:

Flash start transmission sequence: 10101010—(on, off, on, off, on, off, on, off)

Followed by MAC address binary data: 00010100 01011101 00111011 10100010 00000110 00110111—(off, off, off, on, off, . . . , on, on, on)

Followed by end transmission sequence: 01010101—

The camera system may process each frame looking for the LED light source. If found this may indicate a 1. If not found this may indicate 0. One may wait until one observes the start sequence and then may start recording the MAC address bit data until one observes the stop sequence. One may use the timing of the start sequence as an indicator of the timing of other data. The MAC address bit data may be converted into a MAC address byte array and delivered to business logic.

Figure 3:
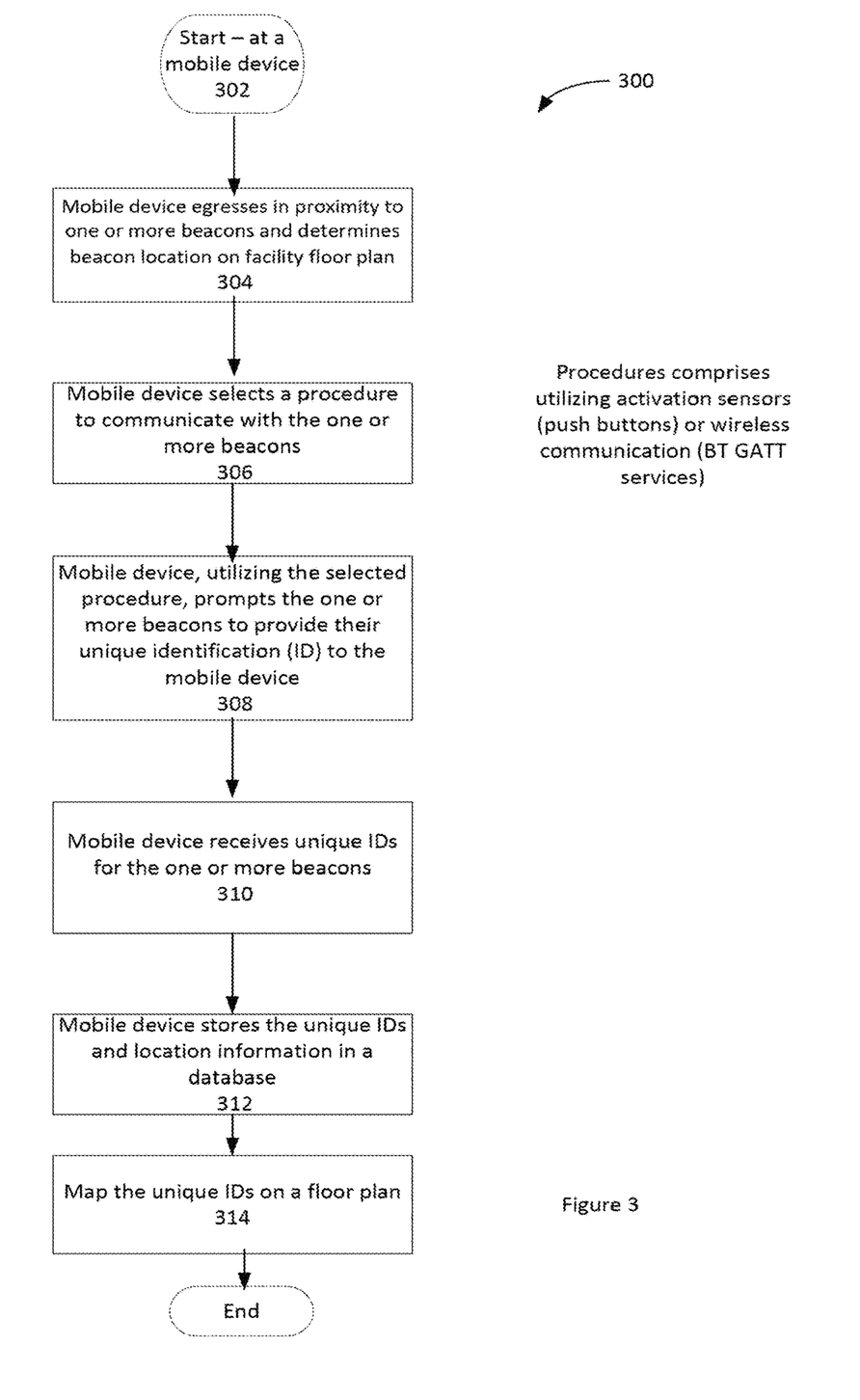
FIGS. 3, 4A, and 4B depict flowcharts illustrating exemplary methods of associating a unique identifier of an object to a spatial coordinate in a facility.

In an exemplary embodiment, FIG. 3 depicts flowchart 300 illustrating a method to associate a unique identifier of an object, such as a BLE beacon to a spatial coordinate in a facility. Starting at mobile device 226 (step 302), mobile device 226 egresses in proximity to one or more beacons and determines their respective locations on a facility floor plan (step 304). The one or more beacons may comprise beacon 202, beacon 206, and beacon 210. User 224, using mobile device 226, then selects a procedure to communicate with the one or more beacons. (step 306) Utilizing the selected procedure, the mobile device 226, prompts the one or more beacons to provide their identifications (IDs) to the mobile device 226. (step 306) Based on the execution of the procedure, the mobile device 226 receives unique IDs for the one or more beacons. (step 310) Mobile device 226 stores the unique IDs and their associated location information in a database within mobile device. (step 312) Finally, user 224 maps the unique IDs on a floor plan. The user may use an application on mobile device 226 for this step. (step 314)

Figure 4A:
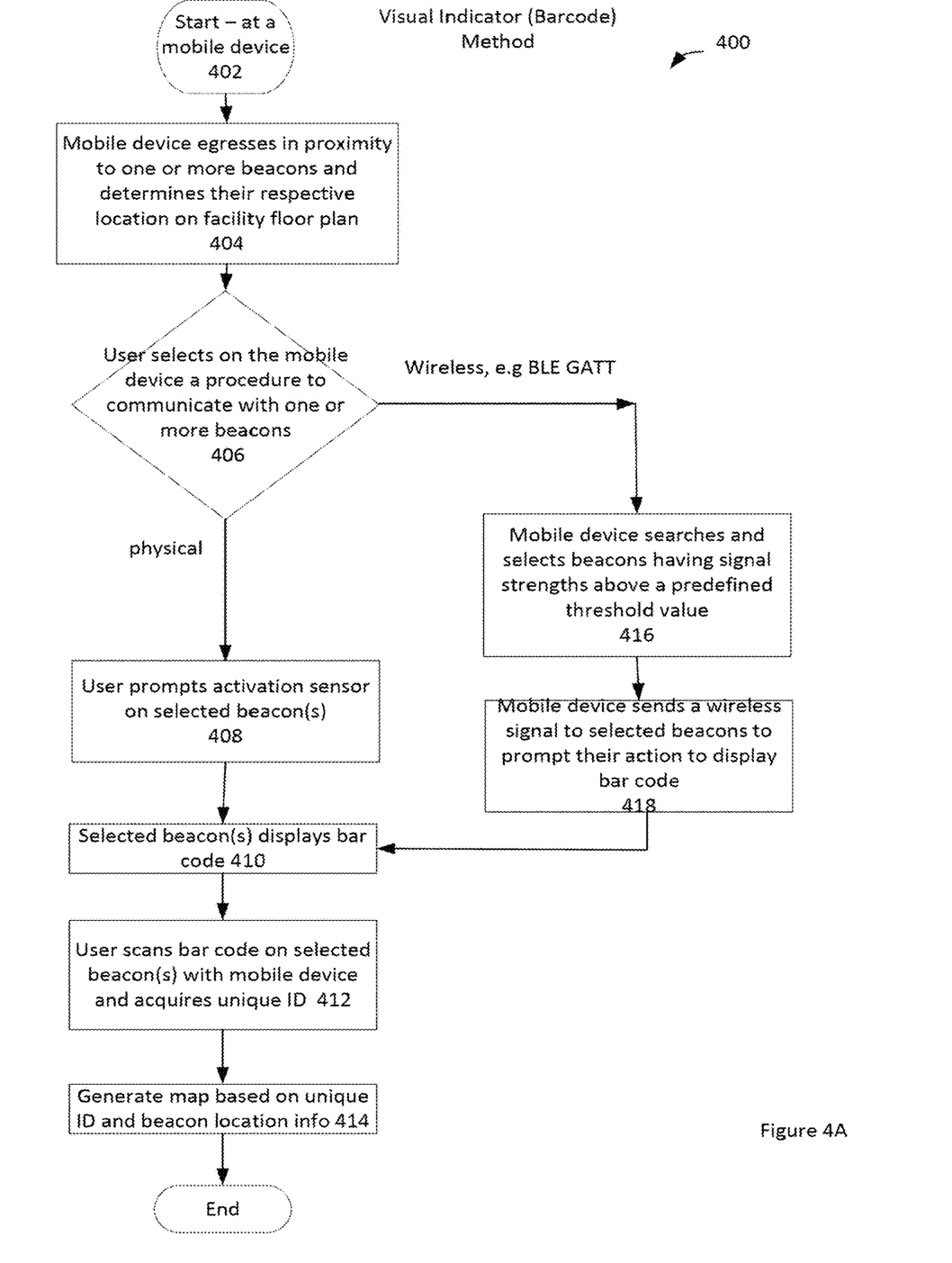

In another exemplary embodiment, FIG. 4A depicts flowchart 400 illustrating a method to associate a unique identifier of an object, such as a BLE beacon to a spatial coordinate in a facility. This method utilizes a visual indicator, such as a barcode to transfer a beacon's unique ID to the mobile device 226.

Starting at a mobile device 226, (step 402), mobile device 226 egresses in proximity to one or more beacons and determines their respective locations on a facility floor plan (step 404). User 224 selects on the mobile device a procedure to communicate with one or more beacons. (step 406) The one or more beacons may comprise beacon 202, beacon 206, and beacon 210. If user 224 selects a physical activation, user 224 prompts an activation sensor 217 on selected beacon(s). (step 408) If user 224 selects a wireless communication for activation, the mobile device 226 searches and selects beacons having signal strengths above a predefined threshold value. (step 416) Then mobile device 226 sends a wireless signal to selected beacons to prompt their action to display a barcode. (step 418) The selected beacons from step 408 or step 418 then display a bar code on display 219. (step 410)

User 224 scans the barcodes on selected beacon(s) with mobile device 226 and acquires identifications for the selected beacon(s). (step 412) Based on this information, user 224 generates a map of the identifications of the selected beacons and their respective locations. (step 414)

Figure 4B:
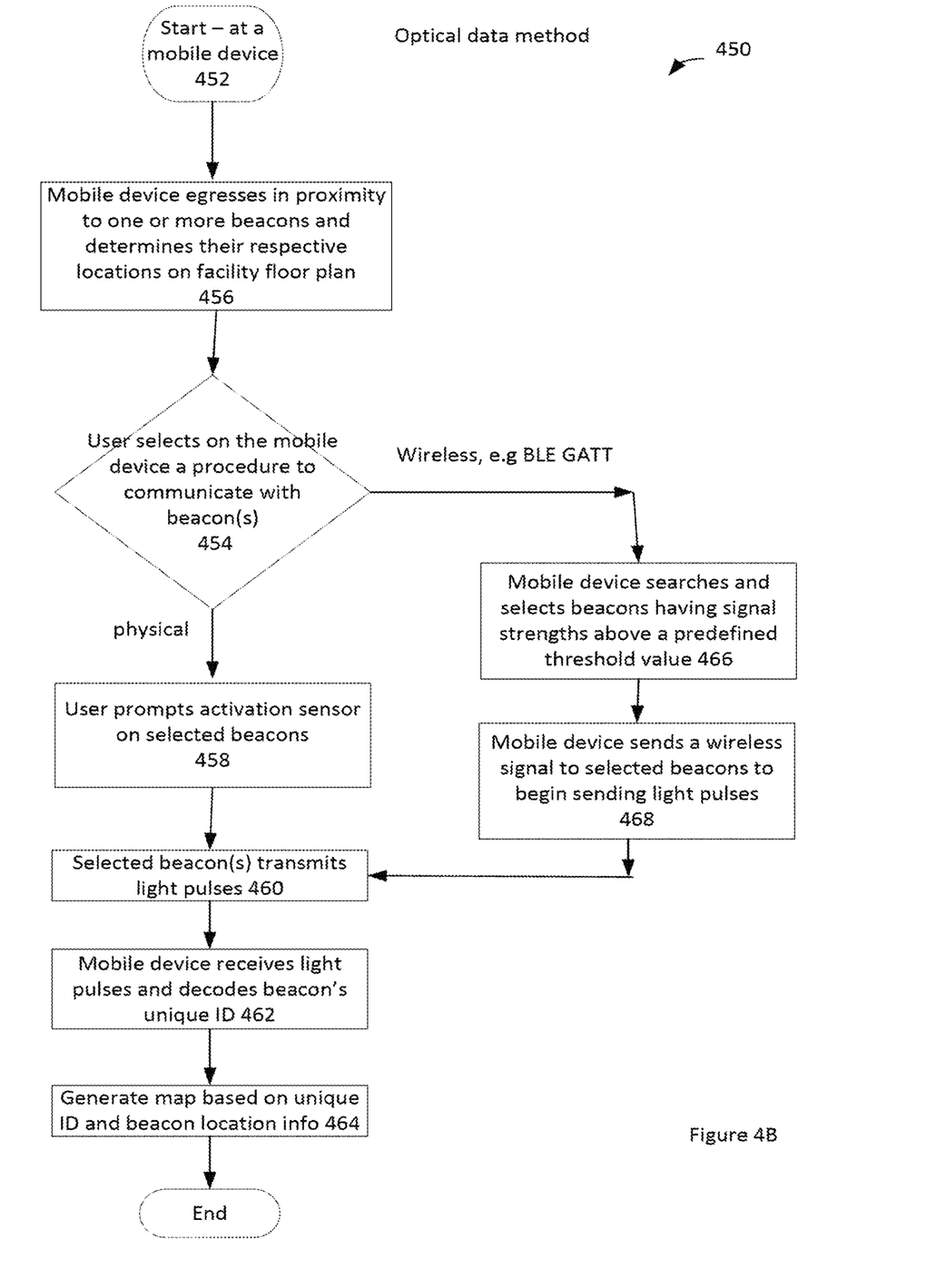

In another exemplary embodiment, FIG. 4B depicts flowchart 450 illustrating a method to associate a unique identifier of an object, such as a BLE beacon to a spatial coordinate in a facility. This method transfers a beacon's unique ID to the mobile device 226 via optical data transmission.

Starting at a mobile device 226 (step 452), mobile device 226 egresses in proximity to one or more beacons and determines their respective locations on a facility floor plan. (step 456) The one or more beacons may comprise beacon 202, beacon 206, and beacon 210. User 224 selects on mobile device 226 a procedure to communicate with one or more beacons. (step 454) If user 224 selects a physical activation, then user 224 prompts activation sensor 217 on selected beacons(s). (step 458) If user 224 selects a wireless communication for activation, mobile device 226 searches and selects beacons having signal strengths above a predefined threshold value. (step 466) Then mobile device 226 sends a wireless signal to selected beacons to begin sending light pulses 220. (step 468) Selected beacon(s) from step 408 or step 418 transmit light pulses 220 to mobile device 226. (step 460) Mobile device 226 receives the light pulses 220 and decodes the unique IDs of the selected beacon(s). Based on this information, user 224 generates a map of the identifications of the selected beacons and their respective locations. (step 464)

Exemplary Embodiments

A1. A device, comprising: a transceiver that wirelessly communicates with a mobile device; an activation sensor; a database that stores an identification of the device; and a processor communicatively coupled to the database, wherein, in response to receiving a wireless signal from the mobile device, the device communicates with the mobile device via a first procedure to transmit the identification to the mobile device; and wherein, in response to a prompt of the activation sensor, the device communicates with the mobile device via a second procedure to transmit the identification to the mobile device.

A2. The device according to claim 1, comprising a display, wherein, in response to a prompt of the activation sensor, the device presents a visual indicator comprising the identification on the display.

A3. The device according to claim 2, wherein the visual indicator is a barcode.

A4. The device according to claim 1, comprising a display, wherein, in response to receiving a wireless signal from the mobile device indicating a signal strength greater than a predefined threshold value, the device presents a visual indicator comprising the identification on the display.

A5. The device according to claim 4, wherein the visual indicator is a barcode.

A6. The device according to claim 1, comprising an optical transmitter, wherein, in response to a prompt of the activation sensor, the device transmits light pulses comprising the identification with the optical transmitter.

A7. The device according to claim 1, comprising an optical transmitter, wherein, in response to receiving a wireless signal from the mobile device indicating a signal strength greater than a predefined threshold value, the device transmits light pulses comprising the identification with the optical transmitter.

A8. The device according to claim 7, wherein, in response to receiving instructions from the mobile device, the device starts transmitting light pulses, stops transmitting light pulses, and/or transmits light pulses for a predetermined period of time.

A9. The device according to claim 1, wherein the device and the mobile device communicate on an ad-hoc basis utilizing Bluetooth Generic Attribute (BT GATT) service.

A10. The device according to claim 1, wherein the identification comprises an encoded MAC address of the device.

A11. A method comprising: selecting, with a mobile device, a procedure to communicate with one or more stationary devices; prompting, with the mobile device, the one or more stationary devices to provide their identifications to the mobile device utilizing the selected procedure; receiving, with the mobile device, the identifications for the one or more stationary devices; and mapping, with the mobile device, the identifications and associated location information of the one or more stationary devices on a floor plan.

A12. The method according to claim 11, comprising: egressing, with the mobile device, in proximity to a selected stationary device; and communicating, with the mobile device, with the selected stationary device by prompting an activation sensor on the selected stationary device causing the selected stationary device to display a barcode that depicts identification for the selected stationary device; scanning, with the mobile device, the barcode to receive the identification of the selected stationary device.

A13. The method according to claim 11, comprising: communicating, with the mobile device, by sending a wireless signal from the mobile device to the one or more stationary devices; measuring, with the mobile device, a signal strength of the communication with the one or more stationary devices; selecting, with the mobile device, the one or more stationary devices that have a signal strength greater than a predefined threshold value; prompting each of the selected one or more stationary devices to display a visual indicator comprising an identification.

A14. The method according to claim 13, wherein, if the visual indicator comprises a barcode, scanning the barcode with the mobile device to acquire the identification.

A15. The method according to claim 13, comprising instructing, with the mobile device, each of the selected one or more stationary devices to display the visual indicator at a particular time and/or for a predetermined period of time.

A16. The method according to claim 11, comprising communicating with the one or more stationary devices by: prompting an activation sensor on each of the stationary devices; receiving light pulses comprising the identifications of each of the stationary devices from optical transmitters on each of the one or more stationary devices.

A17. The method according to claim 11, comprising: communicating, with the mobile device, by sending a wireless signal from the mobile device to the one or more stationary devices; measuring, with the mobile device, a signal strength of the communication with the one or more stationary devices; selecting, with the mobile device, the one or more stationary devices that have a signal strength greater than a predefined threshold value; and prompting, with the mobile device, each of the selected one or more stationary devices to transmit light pulses comprising its identification to the mobile device.

A18. The method according to claim 11, comprising, in response to determining that the mobile device is in proximity to one of the one or more stationary devices, saving associated location information on the mobile device.

A19. The method according to claim 11, wherein the identifications comprise an encoded MAC address.

A20. A computer readable apparatus comprising a non-transitory storage medium storing instructions for a mobile device to determine an identification for each of one or more stationary devices, the instructions, when executed on a processor, causes the mobile device to: select a procedure to communicate with one or more stationary devices; prompt the one or more stationary devices to provide their identifications to the mobile device utilizing the selected procedure; receive the identifications for the one or more stationary devices; and map the identifications and associated location information of the one or more stationary devices on a floor plan.

To supplement the present disclosure, this application incorporates entirely by reference the following commonly assigned patents, patent application publications, and patent applications:

U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. Nos. 8,727,223; D702,237;
U.S. Pat. Nos. 8,740,082; 8,740,085;
U.S. Pat. Nos. 8,746,563; 8,750,445;
U.S. Pat. Nos. 8,752,766; 8,756,059;
U.S. Pat. Nos. 8,757,495; 8,760,563;
U.S. Pat. Nos. 8,763,909; 8,777,108;
U.S. Pat. Nos. 8,777,109; 8,779,898;
U.S. Pat. Nos. 8,781,520; 8,783,573;
U.S. Pat. Nos. 8,789,757; 8,789,758;
U.S. Pat. Nos. 8,789,759; 8,794,520;
U.S. Pat. Nos. 8,794,522; 8,794,525;
U.S. Pat. Nos. 8,794,526; 8,798,367;
U.S. Pat. Nos. 8,807,431; 8,807,432;
U.S. Pat. Nos. 8,820,630; 8,822,848;
U.S. Pat. Nos. 8,824,692; 8,824,696;
U.S. Pat. Nos. 8,842,849; 8,844,822;
U.S. Pat. Nos. 8,844,823; 8,849,019;
U.S. Pat. Nos. 8,851,383; 8,854,633;
U.S. Pat. Nos. 8,866,963; 8,868,421;
U.S. Pat. Nos. 8,868,519; 8,868,802;
U.S. Pat. Nos. 8,868,803; 8,870,074;
U.S. Pat. Nos. 8,879,639; 8,880,426;
U.S. Pat. Nos. 8,881,983; 8,881,987;
U.S. Pat. Nos. 8,903,172; 8,908,995;
U.S. Pat. Nos. 8,910,870; 8,910,875;
U.S. Pat. Nos. 8,914,290; 8,914,788;
U.S. Pat. Nos. 8,915,439; 8,915,444;
U.S. Pat. Nos. 8,916,789; 8,918,250;
U.S. Pat. Nos. 8,918,564; 8,925,818;
U.S. Pat. Nos. 8,939,374; 8,942,480;
U.S. Pat. Nos. 8,944,313; 8,944,327;
U.S. Pat. Nos. 8,944,332; 8,950,678;
U.S. Pat. Nos. 8,967,468; 8,971,346;
U.S. Pat. Nos. 8,976,030; 8,976,368;
U.S. Pat. Nos. 8,978,981; 8,978,983;
U.S. Pat. Nos. 8,978,984; 8,985,456;
U.S. Pat. Nos. 8,985,457; 8,985,459;
U.S. Pat. Nos. 8,985,461; 8,988,578;
U.S. Pat. Nos. 8,988,590; 8,991,704;
U.S. Pat. Nos. 8,996,194; 8,996,384;
U.S. Pat. Nos. 9,002,641; 9,007,368;
U.S. Pat. Nos. 9,010,641; 9,015,513;
U.S. Pat. Nos. 9,016,576; 9,022,288;
U.S. Pat. Nos. 9,030,964; 9,033,240;
U.S. Pat. Nos. 9,033,242; 9,036,054;
U.S. Pat. Nos. 9,037,344; 9,038,911;
U.S. Pat. Nos. 9,038,915; 9,047,098;
U.S. Pat. Nos. 9,047,359; 9,047,420;
U.S. Pat. Nos. 9,047,525; 9,047,531;
U.S. Pat. Nos. 9,053,055; 9,053,378;
U.S. Pat. Nos. 9,053,380; 9,058,526;
U.S. Pat. Nos. 9,064,165; 9,064,167;
U.S. Pat. Nos. 9,064,168; 9,064,254;
U.S. Pat. Nos. 9,066,032; 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;

U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;

U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HANDHELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HANDHELD DIMENSIONER WITH DATA-QUALITY INDICATION filed Oct. 21, 2014 (Laffargue et al.);
U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE AGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

What is claimed is:

1. A system, comprising:
a processor configured to:
receive a first user input to select a procedure to communicate with a stationary device in proximity to a mobile device, wherein a location on a floor of a facility of the stationary device is unknown, and wherein the selected procedure is a wireless communication;

measure a beacon signal strength from the stationary device;

in response to the beacon signal strength being above a predefined signal strength, transmit a wireless signal to the stationary device, wherein the wireless signal comprises a request to display a barcode on a visual display associated with the stationary device;

scan the barcode of the stationary device to determine an identification of the stationary device;

map the identification of the stationary device with a current location of the mobile device on a floor plan, wherein the current location of the mobile device is representative of the location of the stationary device in the floor plan; and store the mapping on the mobile device.

2. The system according to claim 1, wherein the stationary device and the mobile device communicate on an ad-hoc basis utilizing Bluetooth Generic Attribute (BT GATT) service.

3. The system according to claim 1, wherein the identification of the stationary device comprises an encoded MAC address.

4. The system according to claim 1, wherein the processor is further configured to:

in response to scanning the barcode, determine that the mobile device is in proximity to the stationary device; and store the current location of the mobile device along with the identification of the stationary device on the mobile device.

5. The system according to claim 1, wherein, in response to transmitting the wireless signal to the stationary device, the processor is further configured to receive a light pulse, from the stationary device, representative of the identification of the stationary device from an optical transmitter on the stationary device.

6. The system according to claim 1, wherein the request includes a particular time and/or a predetermined time period during which the barcode is displayed on the visual display associated with the stationary device.

7. The system according to claim 1, wherein the stationary device comprises a beacon device.

8. A computer program product comprising at least one non-transitory computer-readable storage medium having computer-executable program code stored therein, the computer executable program code comprising program code instructions configured to:

receive a first user input to select a procedure to communicate with a stationary device in proximity to a mobile device, wherein a location on a floor of a facility of the stationary device is unknown, and wherein the selected procedure is a wireless communication;

measure a beacon signal strength in the stationary device;

in response to the beacon signal strength being above a predefined signal strength, transmit a wireless signal to the stationary device, wherein the wireless signal comprises a request to display a barcode or a visual display associated with the stationary device;

scan the barcode of the stationary device to determine an identification of the stationary device;

map the identification of the stationary device with a current location of the mobile device on a floor plan, wherein the current location of the mobile device is representative of the location of the stationary device in the floor plan; and store the mapping on the mobile device.

9. The computer program product according to claim 8, further comprising program code instructions configured to:

in response to scanning the barcode, determine that the mobile device is in proximity to the stationary device; and store the current location of the mobile device along with the identification of the stationary device on the mobile device.

10. The computer program product according to claim 8, wherein, in response to transmitting the wireless signal to the stationary device, further comprising program code instructions configured to receive a light pulse, from the stationary device, representative of the identification of the stationary device from an optical transmitter on the stationary device.

11. The computer program product according to claim 8, wherein the stationary device comprises a beacon device.

\* \* \* \* \*